(12) United States Patent
Melanson et al.

(10) Patent No.: US 8,593,075 B1
(45) Date of Patent: Nov. 26, 2013

(54) CONSTANT CURRENT CONTROLLER WITH SELECTABLE GAIN

(75) Inventors: John L. Melanson, Austin, TX (US); Rahul Singh, Austin, TX (US); Siddharth Maru, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 327 days.

(21) Appl. No.: 13/174,404

(22) Filed: Jun. 30, 2011

(51) Int. Cl.
H05B 37/00 (2006.01)

(52) U.S. Cl.
USPC ............ 315/291; 315/224; 315/307; 315/308

(58) Field of Classification Search
USPC .................. 315/291, 307, 308, 246, 247, 224
See application file for complete search history.

(56) References Cited

U.S. PATENT DOCUMENTS

| | | | |
|---|---|---|---|
| 6,229,292 B1 | 5/2001 | Redl et al. | |
| 6,724,174 B1 | 4/2004 | Esteves et al. | |
| 6,734,639 B2 * | 5/2004 | Chang et al. | 315/291 |
| 6,940,733 B2 | 9/2005 | Schie et al. | |
| 7,099,163 B1 | 8/2006 | Ying | |
| 7,102,902 B1 | 9/2006 | Brown et al. | |
| 7,145,295 B1 | 12/2006 | Lee et al. | |
| 7,276,861 B1 | 10/2007 | Shteynberg et al. | |
| 7,310,244 B2 | 12/2007 | Yang et al. | |
| 7,388,764 B2 | 6/2008 | Huynh et al. | |
| 7,642,762 B2 | 1/2010 | Xie et al. | |
| 7,710,047 B2 | 5/2010 | Shteynberg et al. | |
| 7,719,248 B1 | 5/2010 | Melanson | |
| 7,804,256 B2 | 9/2010 | Melanson | |
| 7,852,017 B1 | 12/2010 | Melanson | |
| 7,880,400 B2 * | 2/2011 | Zhou et al. | 315/247 |
| 8,222,832 B2 * | 7/2012 | Zheng et al. | 315/291 |
| 2006/0022916 A1 | 2/2006 | Aiello | |

(Continued)

FOREIGN PATENT DOCUMENTS

| | | |
|---|---|---|
| EP | 0636889 | 1/1995 |
| WO | 2004051834 A1 | 6/2004 |
| WO | 2008004008 A2 | 1/2008 |
| WO | 2010065598 | 10/2010 |

OTHER PUBLICATIONS

Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.

(Continued)

Primary Examiner — David H Vu
(74) Attorney, Agent, or Firm — Terrile, Cannatti, Chambers & Holland, LLP; Kent B. Chambers

(57) ABSTRACT

A power distribution system includes a selectable gain value to generate a duty cycle modulated control signal to control current supplied to a load. In at least one embodiment, the power distribution system includes a controller and a switch, and the controller generates the duty cycle modulated control signal to control conductivity of the switch. The duty cycle modulated control signal has a period and a pulse width. In at least one embodiment, the controller determines the period of the control signal as a function of a peak allowable link current value (also referred to as a peak allowable output current value) of a switching power converter, an inductor flyback time of the switching power converter, and the gain value. The link current provides current to a load, such as a lighting system that includes light emitting diodes.

23 Claims, 6 Drawing Sheets

(56) References Cited

U.S. PATENT DOCUMENTS

| | | |
|---|---|---|
| 2006/0214603 A1 | 9/2006 | Oh |
| 2006/0261754 A1 | 11/2006 | Lee |
| 2006/0285365 A1 | 12/2006 | Huynh |
| 2007/0024213 A1 | 2/2007 | Shteynberg |
| 2007/0170873 A1 | 7/2007 | Mishima |
| 2007/0182338 A1 | 8/2007 | Shteynberg |
| 2007/0285031 A1 | 12/2007 | Shteynberg |
| 2008/0174291 A1 | 7/2008 | Hansson |
| 2008/0224636 A1 | 9/2008 | Melanson |
| 2008/0259655 A1 | 10/2008 | Wei |
| 2009/0284182 A1 | 11/2009 | Cencur |
| 2010/0141317 A1 | 6/2010 | Szajnowski |
| 2010/0213859 A1 | 8/2010 | Shteynberg |
| 2010/0238689 A1 | 9/2010 | Fei et al. |

OTHER PUBLICATIONS

Dilouie, Craig, Introducing the LED Driver, Electrical Construction & Maintenance (EC&M), Sep. 1, 2004, pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

\* cited by examiner

US 8,593,075 B1

CONSTANT CURRENT CONTROLLER WITH SELECTABLE GAIN

BACKGROUND OF THE INVENTION

1. Field of the Invention

The present invention relates in general to the field of electronics, and more specifically to a method and system for controlling generation of a constant current using a selectable gain.

2. Description of the Related Art

Many electronic systems utilize a direct current (DC) to supply power to a load. "DC current" is also referred to as "constant current". A light emitting diode (LED) represents one example of a constant current load. Light emitting diodes (LEDs) are referred to as constant current devices because LEDs utilize a DC current power source to provide light. References herein to "constant current" refer to a direct current (DC). "Constant" current does not mean that the current cannot change over time. The DC value of the constant current can change to another DC value. Additionally, a constant current may have noise or other minor fluctuations that cause the DC value of the current to fluctuate. "Constant current devices" have a steady state output that depends upon the DC value of the current supplied to the devices.

LEDs are becoming particularly attractive as main stream light sources in part because of energy savings through high efficiency light output, long life, and environmental incentives such as the reduction of mercury. LEDs are semiconductor devices and are best driven by direct current. The brightness of the LED varies in direct proportion to the DC current supplied to the LED. Thus, increasing current supplied to an LED increases the brightness of the LED and decreasing current supplied to the LED dims the LED.

FIG. 1 depicts power distribution system 100 that converts power from voltage source 102 into power usable by load 104. Load 104 is a constant current load that includes, for example, one or more LEDs. A controller 106 controls the power conversion process. Voltage source 102 supplies an alternating current (AC) input voltage $V_{IN}$ to a full bridge diode rectifier 108. The voltage source 102 is, for example, a public utility, and the AC voltage $V_{IN}$ is, for example, a 60 Hz/110 V line voltage in the United States of America or a 50 Hz/220 V line voltage in Europe. The rectifier 108 supplies a rectified AC voltage $V_X$ to the switching power converter 110. The switching power converter 110 serves as a power supply that converts the AC voltage $V_X$ into a DC link voltage $V_{LINK}$.

The controller 106 provides a control signal $CS_0$ to switching power converter 110 to control the conversion of rectified input voltage $V_X$ into a link voltage $V_{LINK}$. The switching power converter 110 can be any type of switching power converter, such as a boost, buck, boost-buck, or Cúk type switching power converter. The link voltage $V_{LINK}$ is generally a DC voltage that is maintained at an approximately constant level by switching power converter 110. Controller 106 also generates control signal $CS_1$ to control load drive switch 112. When control signal $CS_1$ causes switch 112 to conduct, a link current $i_{LINK}$ flows into a primary coil 114 of transformer 116 to magnetize the primary coil 114. When control signal $CS_1$ opens switch 112, primary coil 114 demagnetizes. The magnetization and demagnetization of the primary coil 114 induces a secondary voltage $V_S$ across a secondary coil 118 of transformer 116. Primary voltage $V_P$ is N times the secondary voltage $V_S$, i.e. $V_P = N \cdot V_S$, and "N" is a ratio of coil turns in the primary coil 114 to the coil turns in the secondary coil 118. The load current $i_{LOAD}$ is a direct function of the secondary voltage $V_S$ and the impedance of diode 120, capacitor 122, and load 104. Diode 120 allows the load current $i_{LOAD}$ to flow in one direction. The load current $i_{LOAD}$ charges capacitor 120, and capacitor 120 maintains an approximately DC voltage $V_{LOAD}$ across load 104. Thus, load current $i_{LOAD}$ is a DC current.

Since the control signal $CS_1$ generated by the controller 106 controls the link current $i_{LINK}$, and the link current $i_{LINK}$ controls the voltage $V_P$ across the primary coil 114, the energy transfer from the primary coil 114 to the secondary coil 118 is controlled by the controller 106. Thus, the controller 106 controls the load current $i_{LOAD}$.

The controller 106 operates the switching power converter 110 in a certain mode, such as quasi-resonant mode. In quasi-resonant mode, the control signal $CS_1$ turns switch 112 ON at a point in time that attempts to minimize the voltage across switch 112, and, thus, minimize current through switch 112. Controller 106 generates the control signal $CS_1$ in accordance with a sensed link current $i_{LINK\_SENSE}$, obtained via link current sense path 126. However, the value of the sensed link current $i_{LINK\_SENSE}$ used to determine a period of control signal $CS_1$ is largely dictated by components of power distribution system 100 whose values are fixed. Conversely, the value of the components is generally fixed by values of the period of control signal $CS_1$ that are used to operate switch 112. Thus, the controller 106 does not have much flexibility in the determination of the period of control signal $CS_1$, and providers of components of power distribution system 100 have limited flexibility in specifying the values of the components.

SUMMARY OF THE INVENTION

In one embodiment of the present invention, a method includes receiving a sense signal at an input node of a switching power converter. The method further includes using a selectable gain value to generate a duty cycle modulated control signal to control current supplied to a load, wherein the gain value is proportional to the sense signal and the current supplied to the load. The method also includes controlling the current supplied to the load using the duty cycle modulated control signal.

In another embodiment of the present invention, a system includes a controller to generate a control signal to control current supplied to a load. The controller includes an input node to receive a sense signal at an input node of a switching power converter. The controller is configured to use a selectable gain value to generate a duty cycle modulated control signal to control current supplied to the load. The gain value is proportional to the sense signal of switching power converter controller and the current supplied to the load. The controller is further configured to control the current supplied to the load using the duty cycle modulated control signal.

In a further embodiment of the present invention, an apparatus includes a switching power converter and a load, coupled to the switching power converter. The load includes one or more light emitting diodes. The apparatus further includes a controller to generate a control signal to control current supplied to a load. The controller includes an input node to receive a sense signal at an input node of a switching power converter. The controller is configured to use a selectable gain value to generate a duty cycle modulated control signal to control current supplied to the load. The gain value is proportional to the sense signal of switching power converter controller and the current supplied to the load. The controller is further configured to control the current supplied to the load using the duty cycle modulated control signal.

In an additional embodiment of the present invention, a system includes means for receiving a sense signal at an input node of a switching power converter. The system further includes means for using a selectable gain value to generate a duty cycle modulated control signal to control current supplied to a load. The gain value is proportional to the sense signal and the current supplied to the load. The system further includes means for controlling the current supplied to the load using the duty cycle modulated control signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
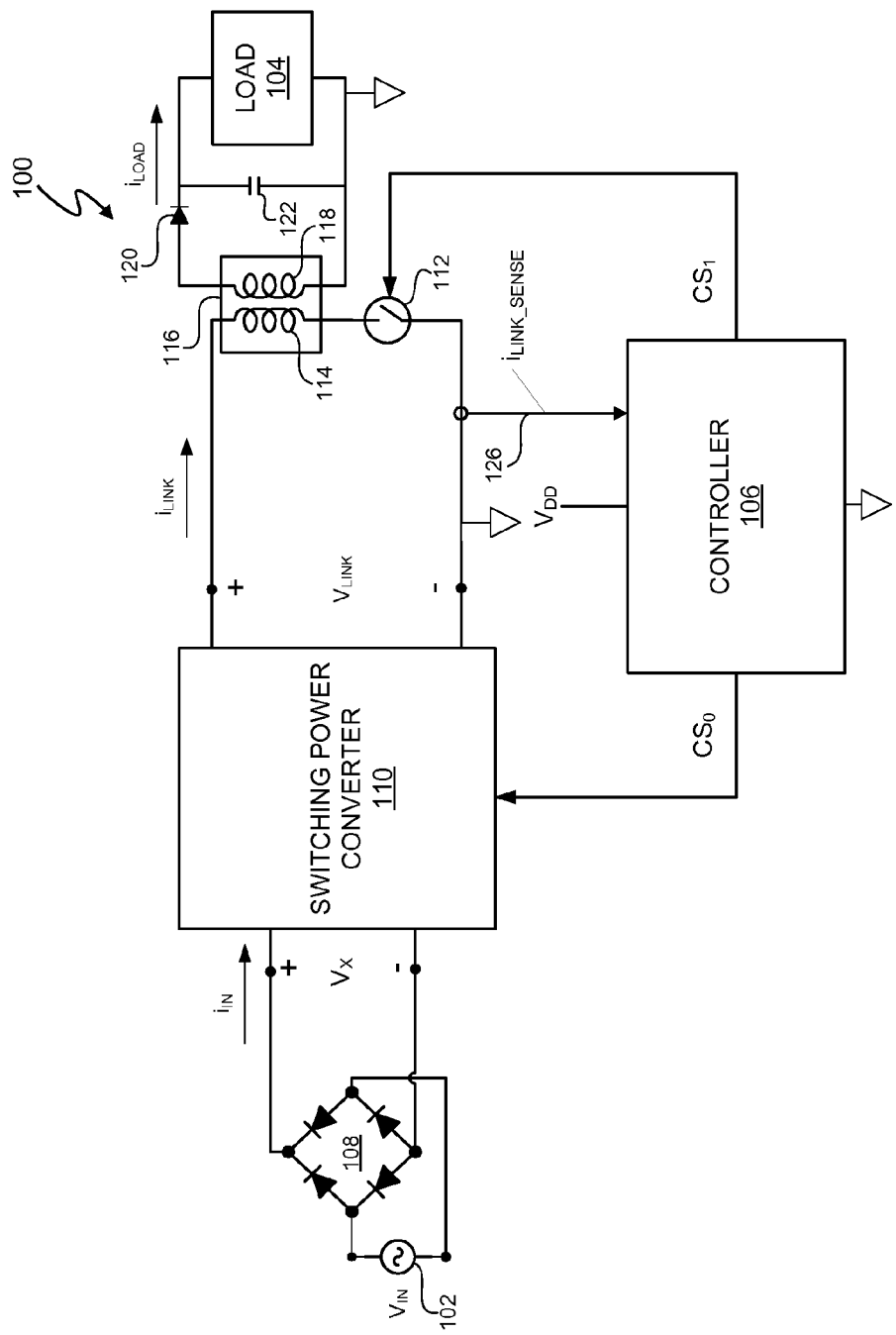
FIG. 1 (labeled prior art) depicts a power distribution system.

A power distribution system includes a selectable gain value to generate a duty cycle modulated control signal to control current supplied to a load. In at least one embodiment, the power distribution system includes a controller and a switch, and the controller generates the duty cycle modulated control signal to control conductivity of the switch. The duty cycle modulated control signal has a period and a pulse width. In at least one embodiment, the controller determines the period of the control signal as a function of a peak allowable link current value (also referred to as a peak allowable output current value) of a switching power converter, an inductor flyback time of the switching power converter, and the gain value. In at least one embodiment, the power distribution system also includes a dimming function and, in this embodiment, the controller determines the period of the control signal as a function of the peak allowable link current value of a switching power converter, an inductor flyback time of the switching power converter, a dimming value, and the gain value.

The peak allowable link current value corresponds to a sense signal, and the sense signal corresponds to an actual link current to be generated by the switching power converter. In at least one embodiment, the actual link current is a current supplied to a load, such as lighting system that includes a set of one or more light emitting diodes ("LED set"). The gain value and the dimming value, if present, are used to determine the period of the control signal by modifying the peak allowable current value, which modifies the actual peak link current. The sense signal can be any signal type, such as a voltage or a current, that represents the actual link current. In at least one embodiment, the sense signal is a voltage produced by the actual link current across a sense resistor. Thus, the actual link current is directly proportional to the sense signal. In at least one embodiment, the controller utilizes the peak allowable link current value as modified by the gain value (and dimming value if present) to determine a period of the control signal. Determining the period of the control signal generates an actual link current, which sets a value of the sense signal that represents the actual link current.

The gain value is proportional to the actual value of a link current and a sense signal representing the actual link current. The controller uses the gain value to determine the value of the peak allowable link current. The peak allowable current value is proportional to the sense signal received by the controller, and the peak allowable current value as modified by the gain value and dimming value, if present, allows the controller to control the actual value of the link current. In at least one embodiment, from a proportionality perspective, an increase in the gain value results in a decrease in the peak allowable link current value. A decrease in the peak allowable current value also decreases the values of the actual link current and sense signal. Conversely, a decrease in the gain value results in an increase in the peak allowable link current value. An increase in the peak allowable current value also increases the values of the actual link current and sense signal. Thus, in this embodiment, the gain value is inversely proportional to the actual link current and the sense signal.

A high value of gain means a smaller value of $i_{PEAK}$ which would mean a larger value of error which would mean a smaller value of the actual peak. $G_{TT}$ is inversely proportional to $i_{PEAK}$ and is inversely proportional to the actual link current and the sense signal.

In at least one embodiment, the gain value assists in several functions in the operation of the switching power converter. For example, by assisting the controller in determining the period of the control signal, the gain value helps ensure operation of the switching power converter in quasi-resonant mode and helps fine tune the value of the peak allowable link current. Furthermore, the actual link current value is also a function of component values of the power distribution system. Since the actual link current is also a function of the gain value, in at least one embodiment, the gain value is selectable to accommodate values of components in the power distribution system that affect the value of the actual link current.

The particular gain value and the method of selecting the gain value is a matter of design choice. In at least one embodiment, the gain value is programmed into a memory of the controller, and the controller retrieves the gain value from the memory to determine the period of the control signal. In at least one embodiment, the controller includes an input terminal to receive a signal, such as a voltage or current signal, that represents the gain value. In at least one embodiment, the controller is capable of accessing and using the gain value from a memory and/or the gain value received via the input terminal.

Figure 2:
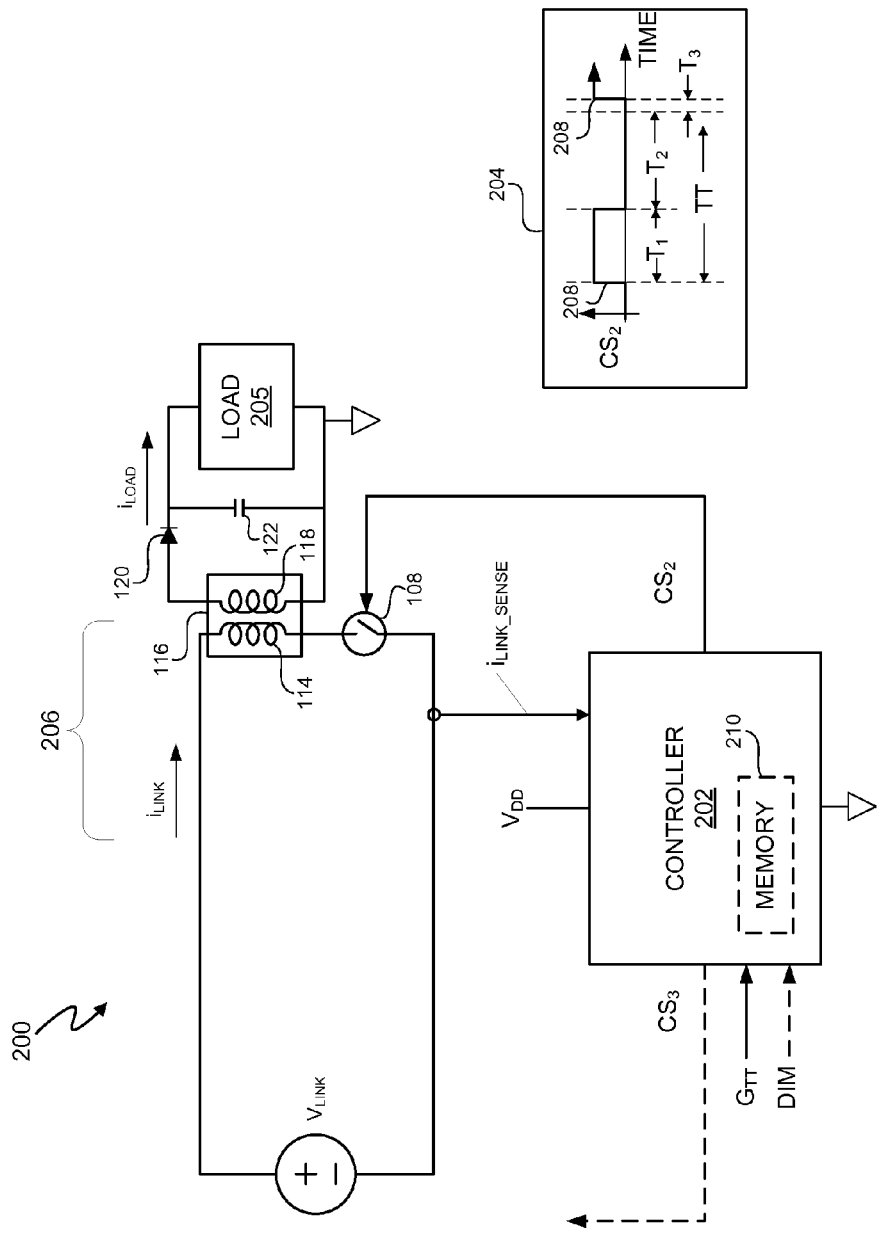
FIG. 2 depicts a power distribution system having a selectable gain value to generate a duty cycle modulated control signal to control current supplied to a load.

FIG. 2 depicts a power distribution system 200 that includes a controller 202 that uses a selectable gain value $G_{TT}$ to generate a duty cycle modulated control signal $CS_2$ to control a constant current $i_{LOAD}$ supplied to a load 205. Load 205 can be any load that utilizes a DC current. In at least one embodiment, load 205 is the same as load 104. The signal graph 204 depicts an exemplary control signal $CS_2$ having a period TT, a pulse width $T_1$, and an off time $T_2$. In at least one embodiment, switch 108 is a field effect transistor that turns "ON" (i.e. conducts), during the pulse width $T_1$ and is otherwise "OFF" (i.e. nonconductive) during time $T_2$. As described with reference to FIG. 1, turning switch 108 "ON" and "OFF" controls the transfer of energy from the primary coil 114 to the secondary side coil 118 of transformer 116 and, thus, controls the load current $i_{LOAD}$. Power distribution system 200 receives an approximately DC voltage $V_{LINK}$. $V_{LINK}$ is, for example, provided by a battery or generated by a switching power converter, such as switching power converter 110 (FIG. 1). The term "approximately" is used because a DC voltage from a switching power converter can vary by, for example, 5-10% of a nominal value and can contain ripple and noise.

In at least one embodiment, the controller 202 compares the sensed link current $i_{LINK\_SENSE}$ with a reference value and determines the pulse width $T_1$ so that the link current $i_{LINK}$ maintains a value within a predetermined range. In at least one embodiment, the predetermined range is dictated by the component values of transformer 116, diode 120, capacitor 122, and load 205. Additionally, controller 202 determines the pulse width $T_1$ of control signal $CS_2$. In at least one embodiment, controller 202 generates control signal $CS_2$ so that load driver circuit 206 operates in a specific mode, such as quasi-resonant mode. In quasi-resonant mode, the current $i_{LINK}$ in primary coil 114 increases during the pulse width time $T_1$ and decreases during time $T_2$. Time $T_2$ is referred to as the "flyback" time because time $T_2$ represents the amount of time for the current $i_{LINK}$ in the primary coil 114 to decrease to zero. In quasi-resonant mode, controller 202 generates the leading edge 208 following a short delay time $T_3$ after the end of the flyback time. In at least one embodiment, the delay time $T_3$ is the amount of time for the voltage to reach a percentage, such as 25-30%, of the peak value of a voltage between the switch 108 and the primary coil 114.

In at least one embodiment as subsequently explained in more detail, the pulse width TT is a function of a peak value of sensed link current $i_{LINK\_SENSE}$, the time $T_2$ of control signal $CS_2$, and the gain value $G_{TT}$. In at least one embodiment, the power distribution system 200 also receives a dim signal DIM. For example, in a lighting system, the dim signal DIM represents a dimming level for the load 205. In at least one embodiment, the load 205 includes one or more LEDs, and the dim signal DIM indicates a dimming level of the one or more LEDs. When a dim signal DIM is present, in at least one embodiment, the pulse width TT is also a function of the dim signal DIM.

In at least one embodiment, the controller 202 utilizes the gain value $G_{TT}$ to modify an allowable peak value of the sensed link current $i_{LINK\_SENSE}$ and/or the time $T_2$. By modifying the peak value and/or the time $T_2$ with the selectable gain value $G_{TT}$ in the determination of the period TT, the selectable gain value $G_{TT}$ allows the controller 202 to obtain a finer control over the determination of the period TT of control signal $CS_2$. Having finer control can help ensure that the load driver circuit 206 operates in quasi-resonant mode. Additionally, since the selection of component values in power distribution system 200 affects the generation of control signal $CS_2$, use of the gain value $G_{TT}$ allows designers to select from a greater range of component values and/or from cheaper components having a wider tolerance range while still allowing the load driver circuit 206 to operate in a desired mode, such as in quasi-resonant mode. Accordingly, in at least one embodiment and as subsequently described in more detail, the gain value $G_{TT}$ is set after components of the power distribution system 200 have been selected.

The gain value $G_{TT}$ can be selected in any of a variety of ways. For example, in at least one embodiment, the gain value is an input signal, such as a voltage or signal, which represents a particular gain value $G_{TT}$. In at least one embodiment, the gain value $G_{TT}$ is selected by inputting the gain value $G_{TT}$ into controller 202 and storing the gain value $G_{TT}$ in an optional memory 210. In this embodiment, the controller 202 accesses the gain value $G_{TT}$ from the optional memory 210 and utilizes the gain value $G_{TT}$ to generate the control signal $CS_2$.

In at least one embodiment, the controller 202 can be configured to generate control signal $CS_2$ or configured to generate both control signal $CS_2$ and $CS_3$. Control signal $CS_3$ controls the generation of $V_{LINK}$ by, for example, controlling a switching power converter, such as switching power converter 110 (not shown). The system and method of generating the control signal $CS_3$ is a design choice. In at least one embodiment, switching power converter 110 is a boost-type converter, and control signal $CS_3$ is generated as described in U.S. Pat. No. 7,719,246, entitled "Power Control System Using a Nonlinear Delta-Sigma Modulator with Nonlinear Power Conversion Process Modeling", filed Dec. 31, 2007, inventor John L. Melanson, and assignee Cirrus Logic, Inc., which is hereby incorporated by reference in its entirety.

The particular implementation of controller 202 is a matter of design choice. For example, in at least one embodiment, controller 202 is implemented as an integrated circuit. In at least one embodiment, controller 202 is implemented using a combination of one or more integrated circuits and one or more discrete components.

Figure 3:
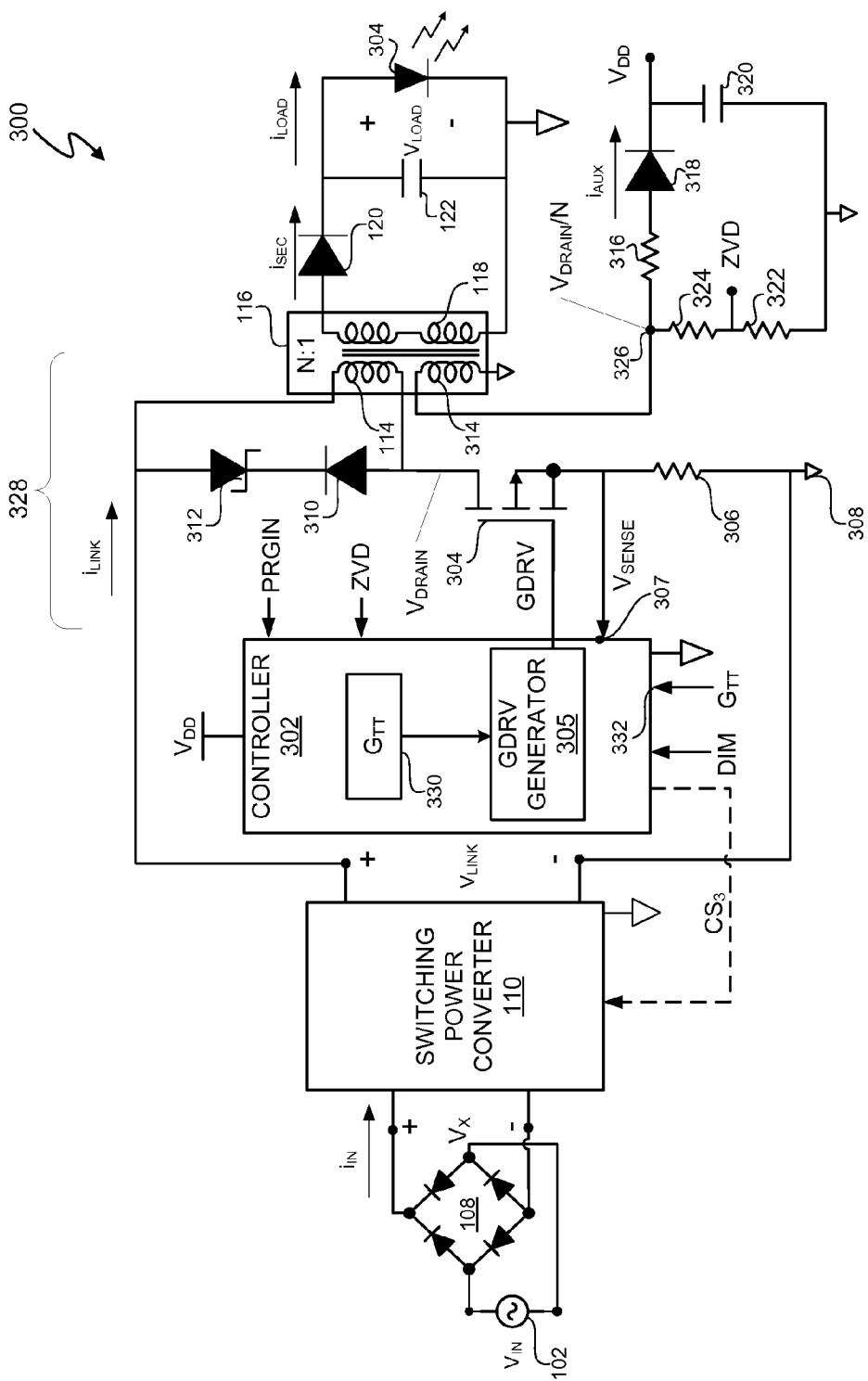
FIG. 3 depicts an embodiment of the power distribution system of FIG. 2.
Figure 4:
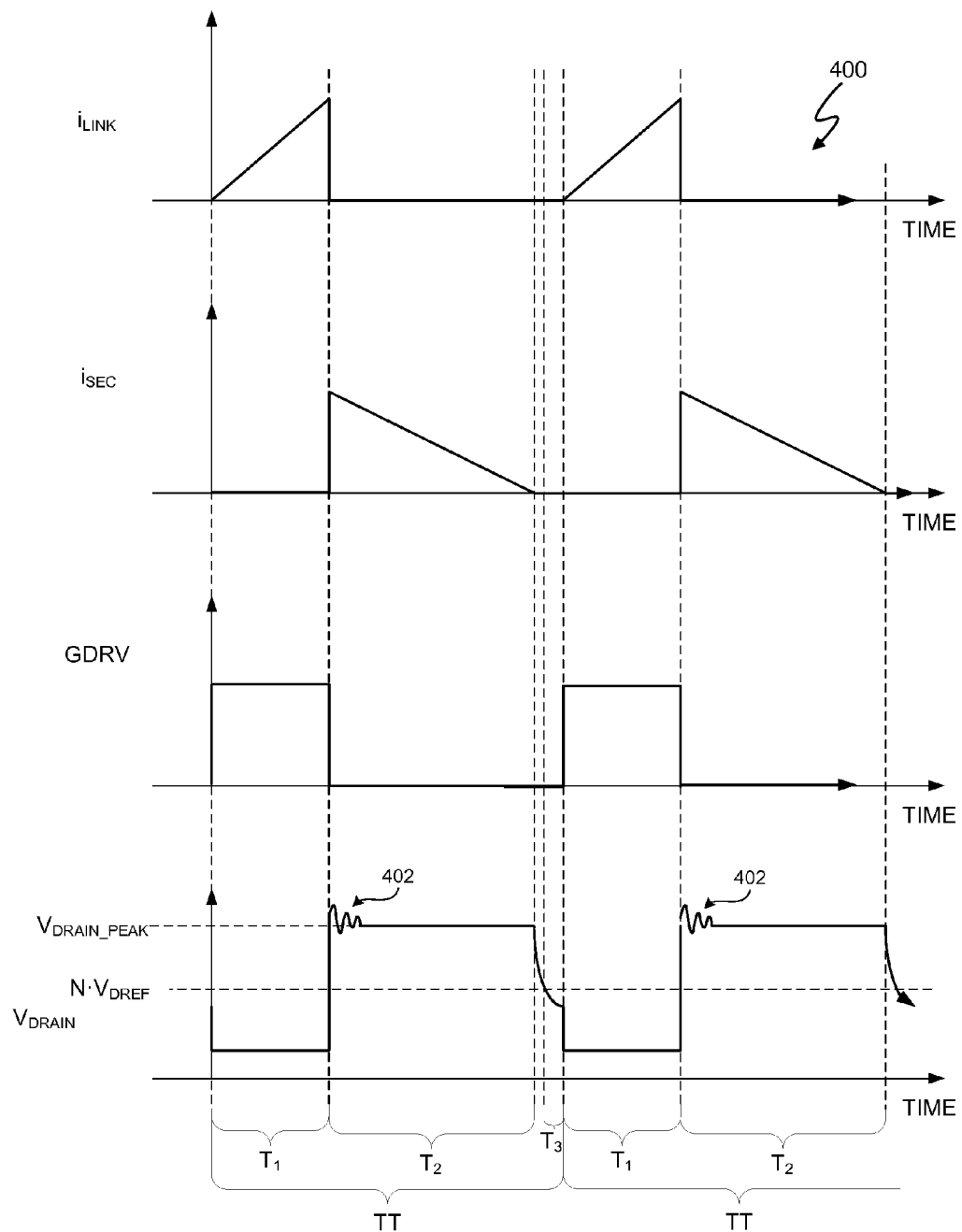
FIG. 4 depicts exemplary signal values of the power distribution system of FIG. 3.

FIG. 3 depicts power distribution system 300, which represents one embodiment of power distribution system 200. FIG. 4 depicts exemplary signals and signal timing graphs 400 that correspond to the operation of power distribution system 300. Referring to FIGS. 3 and 4, the voltage $V_{LINK}$ is an approximately DC voltage supplied by switching power converter 110. The input supply voltage 102, rectifier 108, and switching power converter 110 are described with reference to FIG. 1.

Power distribution system 300 includes controller 302, which represents one embodiment of controller 202. As subsequently described in more detail, controller 302 utilizes the selectable gain value $G_{TT}$ to generate a duty cycle modulated control signal GDRV to control the load current $i_{LOAD}$ supplied to LED set 304. The GDRV control signal generator 305 generates the control signal GDRV. The control signal GDRV represents one embodiment of control signal $CS_2$ (FIG. 2). LED set 304 includes one or more LEDs, and LED set 304 represents one embodiment of load 205. During time period $T_1$, the control signal GDRV is high, which causes field effect transistor (FET) 304 to conduct. When FET 304 conducts, the link current $i_{LINK}$ ramps up as the link current $i_{LINK}$ magnetizes the primary coil 114 of transformer 116. The link current $i_{LINK}$ also flows through sense resistor 306. The controller 302 includes an input node 307 to receive a sense signal $V_{SENSE}$ that represents the link current $i_{LINK}$. The link current $i_{LINK}$ is sampled by controller 302 as the sense signal $V_{SENSE}$. Thus, sense signal $V_{SENSE}$ is a voltage across the sense resistor 306, and the sense signal $V_{SENSE}$ represents one embodiment of the sense signal $i_{LINK\_SENSE}$ (FIG. 2). The resistance value of sense resistor 306 and the drain-to-source impedance are relatively small, so the drain voltage $V_{DRAIN}$ is close to zero while FET 304 conducts. The secondary side current $i_{SEC}$ of transformer 116 is zero while the DC current $i_{LINK}$ magnetizes the primary coil 114.

At the end of time period $T_1$, controller 302 causes the pulse of the gate drive signal GDRV to end and, thus, causes FET 304 to turn OFF. When FET 304 turns OFF, the link current $i_{LINK}$ drops to zero since there is no longer a current path to ground 308. Also, when FET 304 turns OFF, the voltage across the primary coil 114 reverses, and induces a voltage across the secondary coil 118. The induced voltage across the secondary coil 118 causes the secondary current $i_{SEC}$ to rapidly rise at the beginning of the flyback time period $T_2$. The secondary current $i_{SEC}$ charges capacitor 122. The capacitor 122 supplies the load current $i_{LOAD}$, which remains at an approximately DC level. The load voltage $V_{LOAD}$ and load current $i_{LOAD}$ provide power to the LED set 304. Additionally, when the voltage across the primary coil 114 reverses, the drain voltage $V_{DRAIN}$ rapidly rises and settles at a peak drain voltage $V_{DRAIN\_PEAK}$. The secondary voltage across secondary coil 118 is coupled back to the primary coil 114, and parasitic impedances cause momentary oscillations 402 at the beginning of the flyback period $T_2$. Diode 310 prevents the link current $i_{LINK}$ from flowing through the Zener diode 312 during time period $T_1$. The Zener diode 312 allows the oscillations 402 to momentarily rise nominally above the peak drain voltage $V_{DRAIN\_PEAK}$. Thus, diode 310 and Zener diode 312 form a protection circuit that protects the FET 304 from a high drain-to-source current that would otherwise occur when the FET 304 is turned ON again at the beginning of time period $T_1$.

In at least one embodiment, controller 302 determines the period TT of the control signal GDRV in accordance with Equation [1]:

$$TT = i_{PEAK} \times T_2 \times \frac{G_{TT}}{DIM}; \quad [1]$$

where TT is the period of the control signal GDRV, $i_{PEAK}$ is a peak allowable value of the sense signal $V_{SENSE}$ that corresponds to an actual link current $i_{LINK}$, $T_2$ is the flyback period of primary coil 114, $G_{TT}$ is the gain value, and DIM is a dimming value. The selectable gain term $G_{TT}$ effectively modifies $i_{PEAK}$, and the controller 302 determines period TT so that switching power converter 110 operates in a desired mode, such as quasi-resonant mode.

The actual link current $i_{LINK}$ is set by controller 302 to maintain a constant current $i_{LOAD}$ at a level specified by the LED set 304 and the DIM signal. The value of flyback period $T_2$ is a function of, for example, the component values of transformer 116, diode 120, capacitor 122, LED set 304, and parasitic losses. The DIM signal specifies a dimming level. For example, a dimming level of 0.9 indicates a 90% dimming level (e.g. the LED set 304 has a brightness of 90% of a maximum brightness), a dimming level of 0.8 indicates an 80% dimming level, and so on. Thus, without the gain value $G_{TT}$, controller 302 has very little control over the determination of the period TT of the control signal GDRV. Since the actual peak of the link current $i_{LINK}$ is determined by operating parameters of the power distribution system 300 and the peak allowable link current $i_{PEAK}$ is modified by the gain value $G_{TT}$, the gain value $G_{TT}$ in Equation [1] allows controller 302 to obtain finer control over the determination of the period TT. In at least one embodiment, finer control over the period TT allows controller 302 to determine the period TT corresponding to the component values of power distribution system 300 that allow power distribution system 300 to operate in a desired mode, such as in quasi-resonant mode, and maintain a constant current $i_{LOAD}$ to the LED set 304. The particular value of $G_{TT}$ is a design choice and, in at least one embodiment, is chosen so that the LED driver circuit 328 operates in quasi-resonant mode and the power distribution system 300 maintains a constant $i_{LOAD}$ current to the LED set 304.

Transformer 116 also includes an auxiliary coil 314, that also has an N:1 turns ratio of the primary coil 114 to the auxiliary coil 314. During the flyback period $T_2$, auxiliary current $i_{AUX}$ flows through resistor 316 and diode 318 to charge capacitor 320. Capacitor 320 supplies a source voltage $V_{DD}$ for controller 302.

In at least one embodiment, controller 302 operates the LED driver circuit 328 in quasi-resonant mode to increase the efficiency of power distribution system 300. In quasi-resonant mode, controller 302 generates a pulse of gate drive signal GDRV following a delay time $T_3$ after the drain voltage $V_{DRAIN}$ falls below a threshold voltage $N \cdot V_{DREF}$, where N is the multiple of turns between the primary coil 114 and the respective secondary and auxiliary coils 118 and 314. In at least one embodiment, the threshold voltage $N \cdot V_{DREF}$ is a percentage, such as 25-30%, of the peak value of the drain voltage $V_{DRAIN}$. Allowing the drain voltage $V_{DRAIN}$ to fall below the peak drain voltage $V_{DRAIN\_PEAK}$ reduces the amount of current that flows to ground 308 when the FET 304 turns ON and is converted into heat by resistor 306. The current savings increases the efficiency of power distribution system 300.

To determine when the drain voltage $V_{DRAIN}$ falls below the threshold voltage $N \cdot V_{DREF}$, controller 302 senses a voltage ZVD that is developed across resistor 322 during the flyback period $T_2$ at the junction of series resistors 322 and 324. The voltage at node 326 equals the drain voltage $V_{DRAIN}/N$. Resistors 322 and 324 have respective values R1 and R2. The voltage ZVD equals $R1/(R1+R2) \cdot V_{DRAIN}/N$. Thus, the voltage ZVD represents the drain voltage $V_{DRAIN}$. Controller 302 compares the voltage ZVD with the threshold voltage $V_{DREF}$ corresponding to voltage $N \cdot V_{DREF}$. When the controller 302 determines that the voltage ZVD is less than the threshold voltage $V_{DREF}$ after a delay period $T_3$, the controller 302 generates a pulse of the gate drive signal GDRV, and, thus, initiates time period $T_1$.

A mechanism for accessing the gain value $G_{TT}$ by the controller 302 is a matter of design choice. For example, in at least one embodiment, the gain value $G_{TT}$ is stored in a memory 330 of the controller 302 through a programming interface PRGIN. The programming interface PRGIN can be designed to accommodate any data protocol. For example, in at least one embodiment, the programming interface PRGIN is a serial data interface to allow the controller 302 to exchange data via the Philips I²C serial protocol. When memory 330 stores the gain value $G_{TT}$, the controller 302 retrieves the gain value $G_{TT}$ from the memory 330 to determine the period TT of the control signal GDRV. In at least one embodiment, the controller includes a gain value input node 332 to receive a signal, such as a voltage or current signal, that represents the gain value $G_{TT}$. In at least one embodiment, the controller 302 is capable of accessing and using the gain value $G_{TT}$ from the memory 330 or the gain value $G_{TT}$ received via the input terminal 332.

Figure 5:
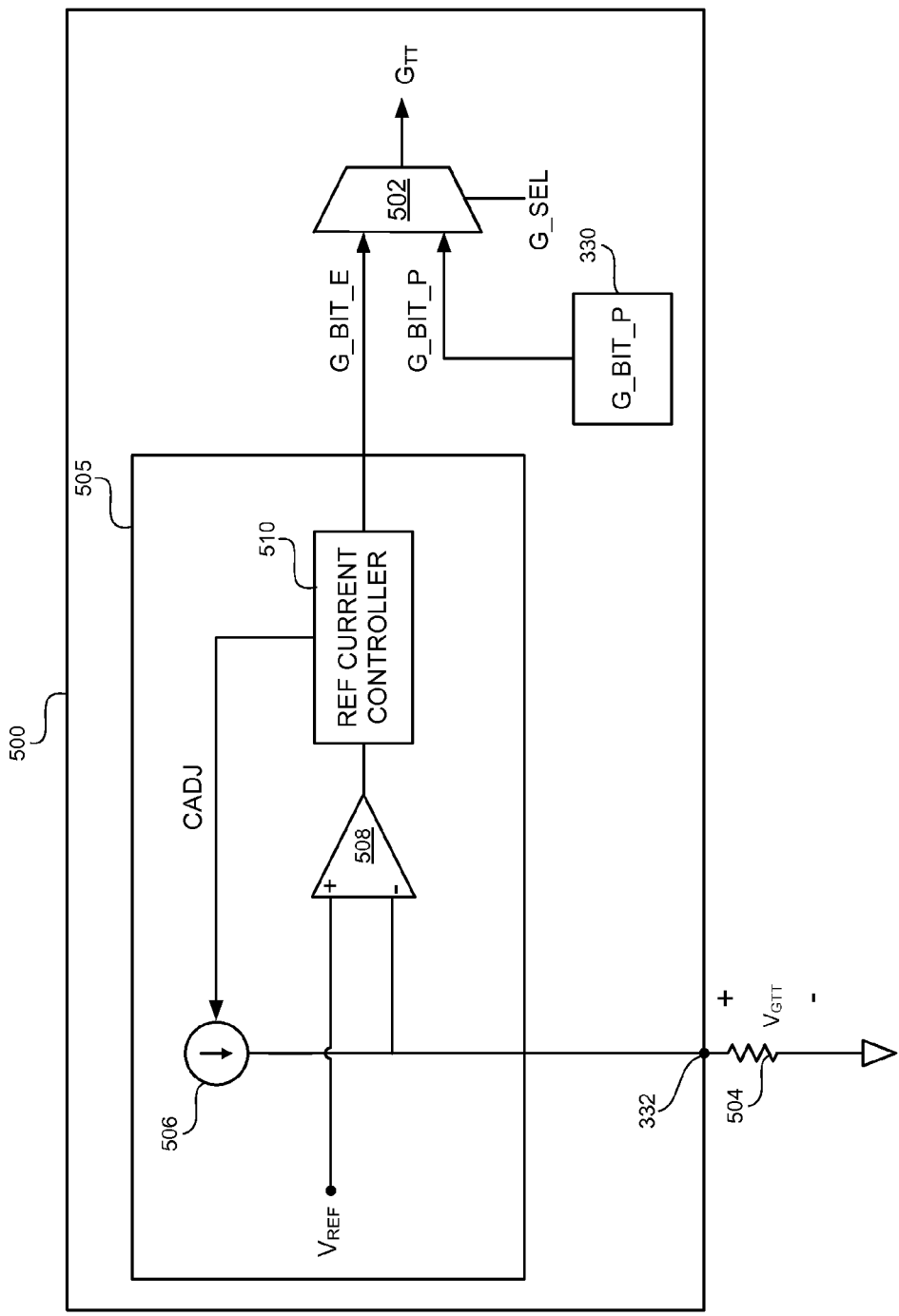
FIG. 5 depicts a gain value access circuit.

FIG. 5 depicts one embodiment of a gain value $G_{TT}$ access circuit 500. The $G_{TT}$ access circuit 500 can be implemented as part of controller 302 or implemented externally to controller 302. In the embodiment of FIG. 5, the $G_{TT}$ access circuit 500 is implemented as part of controller 302. The value of G_BIT_P in memory 330 is used to store the gain value $G_{TT}$. The value of G_BIT_P can be stored by providing the value of G_BIT_P through the programming interface PRGIN. If resistor 504 is connected to input terminal 332, then the analog-to-digital converter (ADC) 505 converts a voltage $V_{GTT}$ across resistor 504 into a digital value G_BIT_E, which represents the gain value $G_{TT}$. Thus, the value of the resistor 504 determines a value of gain value $G_{TT}$.

The ADC 505 includes a current source 506 that provides a current to generate a voltage $V_{GTT}$ across resistor 504. A comparator 508 compares the voltage $V_{GTT}$ with a reference voltage $V_{REF}$. The reference current controller 510 provides a current adjustment signal CADJ to adjust the current supplied by current source 506 until the voltage $V_{GTT}$ is greater than the reference voltage $V_{REF}$. The value of the current adjustment signal CADJ when the voltage $V_{GTT}$ becomes greater than the reference voltage corresponds to a value of the voltage $V_{GTT}$. The reference current controller 510 then generates a digital value G_BIT_E that represents the gain value $G_{TT}$. In at least one embodiment, the gain value $G_{TT}$ is an 8-bit value between 1 and 3.

In at least one embodiment, the controller 302 is programmed to select either a gain value of $G_{TT}$ set by resistor 504 or stored in memory 330. In at least one embodiment, if the resistor 504 is not present and memory 330 stores the value of $G_{TT}$, then controller 302 (FIG. 3) generates the selection signal G_SEL to cause multiplexer 502 to select G_BIT_P as the gain value $G_{TT}$. In at least one embodiment, if the resistor 504 is present and the memory 330 does not store the gain value $G_{TT}$, then controller 302 generates the selection signal G_SEL to cause multiplexer 502 to select G_BIT_E as the gain value $G_{TT}$. If the resistor 504 is present and the memory 330 stores the gain value $G_{TT}$, then, in at least one embodiment, controller 302 selects the gain value $G_{TT}$ for which controller 302 has been programmed to select.

Figure 6:
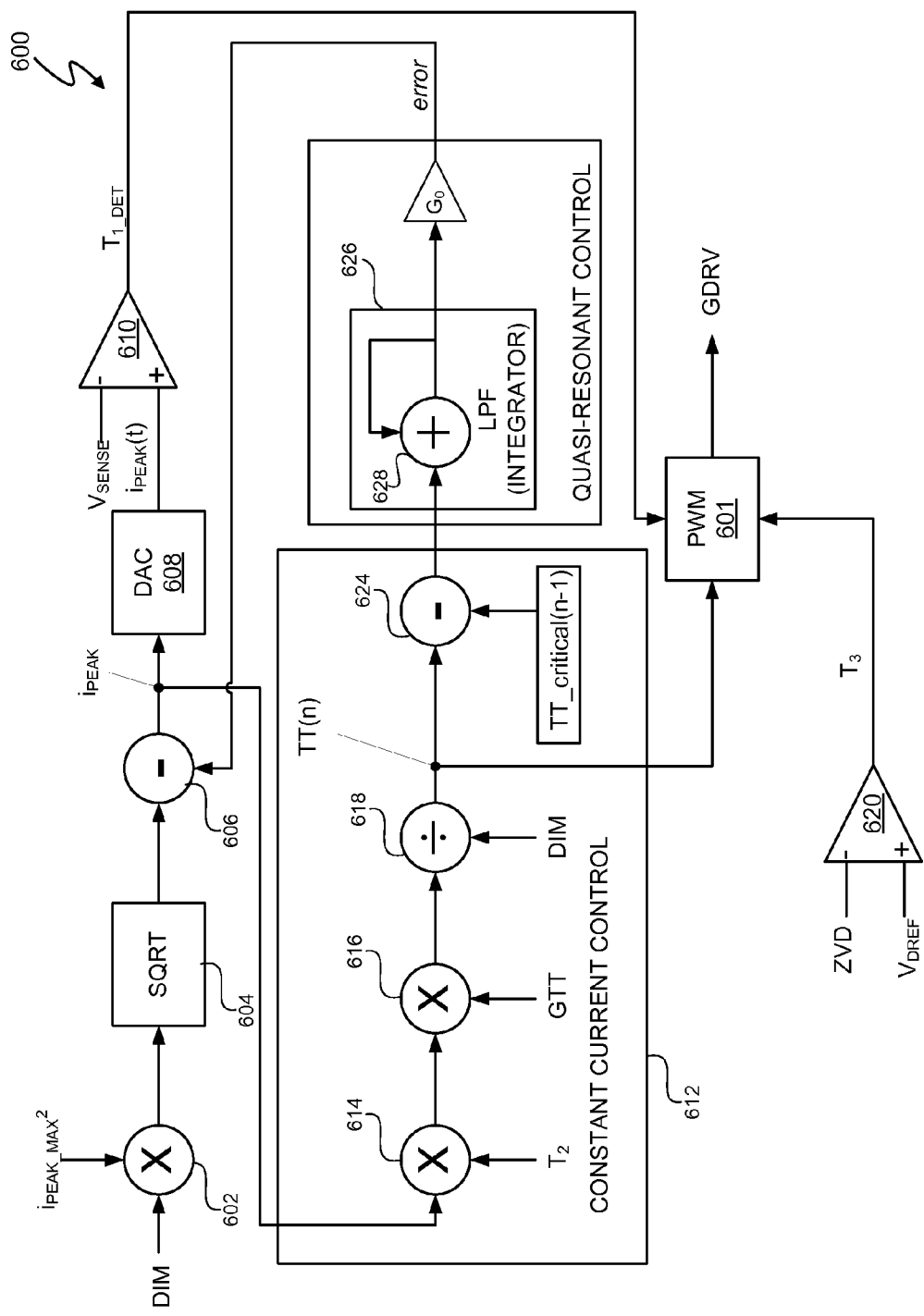
FIG. 6 depicts a control signal generator for the power distribution system of FIG. 3.

FIG. 6 depicts a GDRV control signal generator 600, which represents one embodiment of the GDRV control signal generator 305 (FIG. 3). In at least one embodiment, Equation [2] represents the value of the peak current $i_{PEAK}$, and Equation [3] represents an error (error) between a previous TT_critical, i.e. TT_critical(n−1) and a current value TT(n) of the period TT of the GDRV signal:

$$i_{PEAK} = \sqrt{DIM \times i_{PEAK\_MAX}^2} - \text{error} \qquad [2]; \text{and}$$

$$\text{error} = \frac{(TT(n) - TT\_critical(n-1))}{CONSTANT}; \qquad [3]$$

where $i_{PEAK}$ is the allowable peak value of the sense signal $V_{SENSE}$, DIM is the dimming value, $i_{PEAK\_MAX}$ is a programmable value to set the maximum value of $i_{PEAK}$, TT_critical (n−1) equals $T_1+T_2$ for an immediately preceding cycle of the GDRV signal (i.e. $T_1(n-1)+T_2(n-1)$), and "error" is the value generated in Equation [3]. If period TT equals the critical period TT_critical, the switching power converter 110 operates in critical conduction mode. To operate in quasi-resonant mode, the period TT is greater than the critical period TT_critical.

The gain value $G_{TT}$ is proportional to the actual value of the link current $i_{LINK}$ and the sense signal $V_{SENSE}$ representing the actual link current $i_{LINK}$. From Equations [1], [2], and [3], the controller 302 uses the gain value $G_{TT}$ to determine the value $i_{PEAK}$ of the peak allowable link current. The peak allowable current value $i_{PEAK}$ is proportional to the sense signal $V_{SENSE}$ received at an input node by the controller 302. The peak allowable current value $i_{PEAK}$ as modified by the gain value $G_{TT}$ and dimming value DIM, allows the controller 302 to control the actual value of the link current $i_{LINK}$. From a proportionality perspective, an increase in the gain value $G_{TT}$ results in a larger error in Equation [3], which results in a decrease in the peak allowable link current value $i_{PEAK}$. A decrease in the peak allowable current value $i_{PEAK}$ also decreases the values of the actual link current $i_{LINK}$ and sense signal $V_{SENSE}$. Conversely, a decrease in the gain value $G_{TT}$ results in an increase in the peak allowable link current value $i_{PEAK}$. An increase in the peak allowable current value $i_{PEAK}$ also increases the values of the actual link current $i_{LINK}$ and sense signal $V_{SENSE}$. Thus, the gain value $G_{TT}$ is inversely proportional to the actual link current $i_{LINK}$ and the sense signal $V_{SENSE}$.

A high value of gain means a smaller value of $i_{PEAK}$ which would mean a larger value of error which would mean a smaller value of the actual peak. The gain value $G_{TT}$ is inversely proportional to $i_{PEAK}$ and is inversely proportional to the actual link current and the sense signal $V_{SENSE}$.

In at least one embodiment, the peak allowable value $i_{PEAK}$ is a digital value that is proportional to the value of the sense signal $V_{SENSE}$, and $i_{LINK}=V_{SENSE}/R_{SENSE}=i_{PEAK}/R_{SENSE}$, where "$R_{SENSE}$" represents the value of sense resistor 306 (FIG. 3). Thus, in at least one embodiment, the actual peak value of the link current $i_{LINK}$ is determined by $i_{PEAK}/R_{SENSE}$.

The pulse width modulator 601 initiates a pulse of the control signal GDRV. The multiplier 602 multiplies signal DIM and $i_{PEAK\_MAX}^2$, and square root operator 604 determines the square root of $DIM \cdot i_{PEAK\_MAX}^2$. Subtraction operator 606 subtracts the error signal from the square root of $DIM \cdot i_{PEAK\_MAX}^2$ to determine a digital value of the peak allowable current $i_{PEAK}$ in accordance with Equation [2]. A digital-to-analog converter (DAC) 608 converts the peak allowable current value $i_{PEAK}$ into an analog value $i_{PEAK}(t)$ that corresponds to a peak allowable value of $V_{SENSE}$. Comparator 610 compares the determined value of $i_{PEAK}(t)$ with an actual sensed version $V_{SENSE}$ of the link current $i_{LINK}$ and generates an output signal $T_{I\_DET}$ for pulse width modulator 601. When the output signal $T_{I\_DET}$ indicates that the sense signal $V_{SENSE}$ is equal to $i_{PEAK}(t)$, the pulse width modulator 601 ends the pulse of the control signal GDRV.

The constant current control system 612 represents an exemplary implementation of Equation [1]. Multipliers 614 and 616 multiply peak allowable current $i_{PEAK}$, flyback time $T_2$, and gain value $G_{TT}$. Divider 618 divides the product of $i_{PEAK}$, $T_2$, and $G_{TT}$ by DIM to generate the period TT. The period TT is supplied to pulse width modulator 601 to specify the period of control signal GDRV. Comparator 620 compares the voltage ZVD, which represents the drain voltage $V_{DRAIN}$, to the threshold voltage $V_{DREF}$ (FIG. 4) to determine when the drain voltage $V_{DRAIN}$ has dropped to the threshold voltage $V_{DREF}$. When the voltage ZVD is below the threshold voltage $V_{DREF}$, the output signal $T_3$ changes states. When the output signal $T_3$ changes states, the pulse width modulator 601 initiates a new pulse of control signal GDRV.

From Equation [1], the gain value $G_{TT}$ is directly proportional to the period TT of the control signal GDRV. From Equation [3], the period TT is directly proportional to the error between the period TT and the critical value TT_critical of the period TT. Thus, in at least one embodiment, the gain value can be empirically set so that controller 302 maintains a positive error value (i.e. TT(n) is greater than TT_critical (n−1)), switching power converter 110 operates in quasi-resonant mode.

The error signal is generated by subtracting TT_critical(n−1) of the control signal GDRV, which is the immediately preceding value of $T_1+T_2$, with subtraction operator 624, from period TT(n) which is the current period of control signal GDRV. TT(n)−TT_critical(n−1) is low pass filtered by a low pass filter (LPF) 626 and multiplied by a gain $G_0$ to determine the error signal. The LPF 626 is implemented as an integrator that includes an adder 628 that adds a current value of TT(n)−TT_critical(n−1) with a previous value. The LPF and gain $G_0$ form a quasi-resonant control 630 to ensure that the LED driver circuit 328 operates in quasi-resonant mode by adjusting the value of the peak current $i_{PEAK}$ so that the secondary current $i_{SEC}$ drops to zero prior to initiation of the next pulse of control signal GDRV. The LED driver circuit 328 transfers energy from the link current $i_{LINK}$ via transformer 116 to drive the LED set 304.

Thus, power distribution system includes a selectable gain value to generate a duty cycle modulated control signal to control current supplied to a load. In at least one embodiment, the selectable gain value allows the controller finer control over determining the period of the control signal and allows for increased flexibility in choosing component values of the power distribution system and matching a period of the control signal to the component values. In at least one embodiment, the controller also utilizes a dimming value when determining the period of the control signal.

Although embodiments have been described in detail, it should be understood that various changes, substitutions, and alterations can be made hereto without departing from the spirit and scope of the invention as defined by the appended claims.

What is claimed is:

1. A method comprising:
   receiving a sense signal at an input node of a switching power converter;
   using a selectable gain value to generate a duty cycle modulated control signal to control current supplied to a load, wherein the gain value is proportional to the sense signal and the current supplied to the load; and
   controlling the current supplied to the load using the duty cycle modulated control signal.

2. The method of claim 1 wherein using the selectable gain value comprises:
   retrieving a gain value from a memory.

3. The method of claim 1 wherein using the selectable gain value comprises:
   converting a voltage signal into the gain value.

4. The method of claim 3 wherein converting the voltage signal into the gain value comprises:
   sensing a voltage across a resistor; and
   correlating the voltage to the gain value.

5. The method of claim 1 wherein using the selectable gain value comprises:
   selecting the gain value by one of:
      retrieving a gain value from a memory if the memory stores the gain value; and
      converting a voltage signal into the gain value if the memory does not store the gain value.

6. The method of claim 1 comprising:
   operating a controller to generate the duty cycle modulated control signal.

7. The method of claim 6 further comprising:
   operating the controller to further control a supply of power from the switching power converter to a light source driver circuit; and
   supplying the current to the light source from the light source driver circuit.

8. The method of claim 1 wherein the load comprises a transformer having a primary side and a secondary side, and using the selectable gain value to generate the duty cycle modulated control signal to control current supplied to the load comprises:
   determining a period (TT) of the duty cycle modulated control signal in accordance with:

$$TT = i_{PEAK} \cdot T_2 \cdot G_{TT}/DIM,$$

wherein TT is the period of the duty cycle modulated control signal, $i_{PEAK}$ is a peak allowable value of the sense signal, $T_2$ is a flyback time of the primary side transformer inductor current, $G_{TT}$ is the gain value, and DIM is a dimming value.

9. The method of claim 1 further comprising:
   generating the sense signal as a voltage across a sense resistor, wherein the resistor conducts a link current of the switching power converter.

10. The method of claim 1 wherein the gain value is inversely proportional to the sense signal.

11. The method of claim 1 wherein the load comprises a set of one or more light emitting diodes.

12. A system comprising:
   a controller to generate a control signal to control current supplied to a load, wherein the controller includes an input node to receive a sense signal at an input node of a switching power converter, and the controller is configured to:
      use a selectable gain value to generate a duty cycle modulated control signal to control current supplied to the load, wherein the gain value is proportional to the sense signal of switching power converter controller and the current supplied to the load; and
      control the current supplied to the load using the duty cycle modulated control signal.

13. The system of claim 12 wherein the controller further includes a memory, and the gain value is stored in the memory and selectable by the controller for use in generating the duty cycle modulated control signal.

14. The system of claim 12 wherein the controller further includes a gain value input node to receive a voltage signal representing a gain value for use in generating the duty cycle modulated control signal.

15. The system of claim 12 wherein the controller is further configured to use the selectable gain value by:
   selecting the gain value by one of:
      retrieving a gain value from a memory if the memory stores the gain value; and
      converting a voltage signal into the gain value if the memory does not store the gain value.

16. The system of claim 12 wherein the controller is further configured to provide the duty cycle modulated control signal to a switching power converter to control the link current supplied to the load, wherein the load comprises a light source driver circuit and one or more light emitting diodes.

17. The system of claim 12 wherein the load comprises a transformer having a primary side and a secondary side, and to use the selectable gain value to generate the duty cycle modulated control signal to control current, the controller is configured to:
   determine a period (TT) of the duty cycle modulated control signal in accordance with:

$$TT = i_{PEAK} \cdot T_2 \cdot G_{TT}/DIM,$$

wherein TT is the period of the duty cycle modulated control signal, $i_{PEAK}$ is a peak allowable value of the sense signal, $T_2$ is a flyback time of the primary side transformer inductor current, $G_{TT}$ is the gain value, and DIM is a dimming value.

18. The system of claim 12 further comprising:
   the switching power converter coupled to the controller; and
   a sense resistor coupled to the controller and the switching power converter, wherein during operation of the switching power converter, the sense resistor conducts a link current of the switching power converter to generate the sense signal as a voltage across the sense resistor.

19. The system of claim 12 wherein the load comprises a set of one or more light emitting diodes.

20. The system of claim 12 wherein the gain value is inversely proportional to the sense signal.

21. The system of claim 12 wherein the load comprises a set of one or more light emitting diodes.

22. An apparatus comprising:
   a switching power converter;
   a load, coupled to the switching power converter, wherein the load includes one or more light emitting diodes; and
   a controller, coupled to the switching power converter, to generate a control signal to control the switching power converter and control current supplied to the load, wherein the controller includes an input node to receive a sense signal at an input node of a switching power converter, and the controller is configured to:
      use a selectable gain value to generate a duty cycle modulated control signal to control current supplied to the load, wherein the gain value is proportional to the sense signal of switching power converter controller and the current supplied to the load; and
      control the current to supplied to the load using the duty cycle modulated control signal.

23. A system comprising:
   means for receiving a sense signal at an input node of a switching power converter;
   means for using a selectable gain value to generate a duty cycle modulated control signal to control current supplied to a load, wherein the gain value is proportional to the sense signal and the current supplied to the load; and
   means for controlling the current supplied to the load using the duty cycle modulated control signal.

\* \* \* \* \*